United States Patent
Morise et al.

(10) Patent No.: US 7,175,556 B2
(45) Date of Patent: Feb. 13, 2007

(54) HYDRAULIC CONTROL APPARATUS FOR AUTOMATIC TRANSMISSION

(75) Inventors: Masaru Morise, Nukata-gun (JP); Hideki Miyata, Okazaki (JP); Akio Sugawara, Toyota (JP); Yuji Yasuda, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 218 days.

(21) Appl. No.: 11/075,876

(22) Filed: Mar. 10, 2005

(65) Prior Publication Data

US 2005/0209048 A1    Sep. 22, 2005

(30) Foreign Application Priority Data

Mar. 19, 2004    (JP) .............................. 2004-080290

(51) Int. Cl.
*F16H 31/00*    (2006.01)
(52) U.S. Cl. ..................................... 475/119
(58) Field of Classification Search ............... 475/119, 475/123; 477/906
See application file for complete search history.

(56) References Cited

U.S. PATENT DOCUMENTS 6,398,684 B1 *    6/2002  Kaizu ........................ 475/127
6,432,015 B1 *    8/2002  Takahashi .................... 475/116
6,929,584 B2 *    8/2005  Miyata et al. ............... 477/119
6,966,862 B2 *   11/2005  Inuta ........................... 475/119

FOREIGN PATENT DOCUMENTS

JP    2000-240776    9/2000
JP    2001-248718    9/2001

* cited by examiner

*Primary Examiner*—Dirk Wright
(74) *Attorney, Agent, or Firm*—Kenyon & Kenyon LLP

(57) ABSTRACT

A hydraulic control apparatus for an automatic transmission includes a first SL linear solenoid, a second SL linear solenoid, a third SL linear solenoid, and a fourth SL linear solenoid, which are normal closed type, and a sequence valve. The sequence valve connects the first SL linear solenoid to a servo of a C1 clutch, the second SL linear solenoid to a servo of a C2 clutch, and the fourth SL linear solenoid to a servo of a B3 brake at normal time. The sequence valve selectively connects a D range oil passage to the servo of the C1 clutch and the servo of the C2 clutch, and connects the D range oil passage to the servo of the B3 brake, when an electric failure gas occurred.

5 Claims, 5 Drawing Sheets

FIG. 3

|  | C1 | C2 | B1 | B2 | B3 | F |
|---|---|---|---|---|---|---|
| 1ST | ○ | × | × | ◎ | × | △ |
| 2ND | ○ | × | ○ | × | × | × |
| 3RD | ○ | × | × | × | ○ | × |
| 4TH | ○ | ○ | × | × | × | × |
| 5TH | × | ○ | × | × | ○ | × |
| 6TH | × | ○ | ○ | × | × | × |
| R | × | × | × | ○ | ○ | × |

◎ ENGAGED/APPLIED WHEN ENGINE BRAKE IS APPLIED
△ ENGAGED/APPLIED ONLY WHEN ENGINE DRIVES

FIG. 5

|  | 1stSL N/C | 2ndSL N/C | 3rdSL N/C | 4thSL N/C | C1 | C2 | B1 | B2 | B3 | F |
|---|---|---|---|---|---|---|---|---|---|---|
| 1ST | ○ | × | × | × | ○ | × | × | ◎ | × | △ |
| 2ND | ○ | × | ○ | × | ○ | × | ○ | × | × | × |
| 3RD | ○ | × | × | ○ | ○ | × | × | × | ○ | × |
| 4TH | ○ | ○ | × | × | ○ | ○ | × | × | × | × |
| 5TH | × | ○ | × | ○ | × | ○ | × | × | ○ | × |
| 6TH | × | ○ | ○ | × | × | ○ | ○ | × | × | × |
| R | × | × | × | ○ | × | × | × | ○ | ○ | × |

HYDRAULIC CONTROL APPARATUS FOR AUTOMATIC TRANSMISSION

INCORPORATION BY REFERENCE

The disclosure of Japanese Patent Application No. 2004-080290 filed on Mar. 19, 2004 including the specification, drawings and abstract is incorporated herein by reference in its entirety.

BACKGROUND OF THE INVENTION

1. Field of the Invention

The invention relates to a hydraulic control apparatus for an automatic transmission. More particularly, the invention relates to a hydraulic control apparatus for an automatic transmission, which can achieve a shift speed even when an electric failure has occurred.

2. Description of the Related Art

A hydraulic control apparatus for an automatic transmission has been known which can achieve an intended shift speed thereby allowing a vehicle to run, even when an electric failure has occurred and an automatic transmission cannot be electrically controlled.

Japanese Patent Application Publication No. JP-A-2001-248718 discloses a control apparatus for an automatic transmission, which can achieve a shift speed even when an electric failure has occurred. The control apparatus for an automatic transmission disclosed in Japanese Patent Application Publication No. JP-A-2001-248718 includes a C1 hydraulic servo which controls a C1 clutch; a normal open type C1 solenoid valve which controls supply/drain of hydraulic pressure to/from the C1 hydraulic servo; a C2 hydraulic servo which control a C2 clutch; a normal open type C2 solenoid valve which controls supply/drain of hydraulic pressure to/from the C2 hydraulic servo; a C2B2 supply relay valve which controls supply/drain of hydraulic pressure to/from the C2 solenoid valve; a C3 hydraulic servo which controls a C3 clutch; a normal open type C3 solenoid valve which controls supply/drain of hydraulic pressure to/from the C3 hydraulic servo; a B1 hydraulic servo which controls a B1 clutch; a normal open type B1 solenoid valve which controls supply/drain of hydraulic pressure to/from the B1 hydraulic servo; and a B1 release valve which is provided between the B1 hydraulic servo and the B1 solenoid valve, which achieves drain communication with the B1 hydraulic servo using the hydraulic pressure supplied from the C3 solenoid valve, and which interrupts the hydraulic pressure supplied from the B1 solenoid valve.

With this control apparatus for an automatic transmission, when the C1 solenoid valve is de-energized and the other three solenoid valves are energized at normal time, hydraulic pressure is supplied only to the C1 hydraulic servo and the C1 clutch is engaged, whereby first speed is achieved. When an electric failure has occurred, in the case where one of first to fourth speeds is achieved or in the case where the hydraulic pressure in a D range oil passage is drained and then hydraulic pressure is re-supplied to the D range oil passage, hydraulic pressure is supplied to the C1 hydraulic servo through the C1 solenoid valve, whereby the C1 clutch is engaged. When an electric failure has occurred, the C2B2 supply relay valve interrupts the hydraulic pressure from an oil pump to the C2 solenoid valve. Accordingly, the C2 clutch is disengaged. Hydraulic pressure is supplied to the C3 hydraulic servo through the C3 solenoid valve, and the C3 clutch is engaged. Due to the hydraulic pressure from the C3 solenoid valve, the B1 release valve achieves drain communication with the B1 hydraulic servo, and the hydraulic pressure from the B1 solenoid valve is interrupted. Accordingly, a B1 brake is released. Namely, when an electric failure has occurred, third speed can be achieved. Since third speed can be achieved when an electric failure has occurred, the vehicle is allowed to run at third speed.

According to the invention disclosed in Japanese Patent Application Publication No. JP-A-2001-248718, in order to achieve a shift speed when an electric failure has occurred, normal open type solenoid valves are used as the four solenoid valves which control supply/drain of hydraulic pressure to/from friction engaging elements. Accordingly, unless the three solenoid valves from among the four solenoid valves are energized, first speed cannot be achieved. Therefore, electric power consumption is increased. The electric power to be supplied to the solenoid valves is usually generated by an alternator coupled with a crankshaft of an engine. Accordingly, as the electric power consumption is increased, a load placed on an engine is also increased, which causes a problem that the fuel efficiency is reduced.

SUMMARY OF THE INVENTION

The invention is made in light of the above-mentioned circumstances. It is therefore an object of the invention to provide a hydraulic control apparatus for an automatic transmission, which can reduce electric power consumption at normal time and which can achieve a shift speed even when an electric failure has occurred.

According to an aspect of the invention, there is provided a hydraulic control apparatus for an automatic transmission, which controls hydraulic pressure of an automatic transmission mounted in a vehicle. In this case, the automatic transmission includes multiple friction engaging elements each of which is engaged by being supplied with hydraulic pressure. In the automatic transmission, less than a half of the multiple friction engaging elements are engaged by being supplied with the hydraulic pressure and the friction engaging elements other than the friction engaging elements that are supplied with the hydraulic pressure are disengaged, whereby at least one of multiple shift speeds is achieved. The hydraulic control apparatus for an automatic transmission includes normal closed type electromagnetic valves which are provided so as to correspond to the friction engaging elements such that hydraulic pressure is supplied to the friction engaging elements; an oil pump which generates hydraulic pressure to be supplied to the electromagnetic valves and the friction engaging elements; a first oil passage which is connected to the electromagnetic valve that is energized when a predetermined shift speed is achieved from among the multiple electromagnetic valves; a second oil passage which is connected to the oil pump and which is different from the first oil passage; and a switching device which connects the first oil passage to the friction engaging element and disconnects the second oil passage from the friction engaging element when the electromagnetic valves can be energized, and which disconnects the first oil passage from the friction engaging element and connects the second oil passage to the friction engaging element when the electromagnetic valves cannot be energized.

With the hydraulic control apparatus for an automatic transmission having the above-mentioned structure, when less than a half of the multiple friction engaging elements are engaged and the friction engaging elements other than the friction engaging elements that are supplied with the hydraulic pressure are disengaged, at least one of the multiple shift speeds is achieved. The normal closed type electromagnetic valves provided so as to correspond to the friction engaging elements supply hydraulic pressure to the friction engaging elements. The oil pump generates hydraulic pressure to be supplied to the electromagnetic valves and the friction engaging-elements. Accordingly, when less than a half of the multiple electromagnetic valves are energized and the electromagnetic valves other than the energized electromagnetic valves are de-energized, the friction engaging elements corresponding to the energized electromagnetic valves are engaged and the friction engaging elements corresponding to the de-energized electromagnetic valves are disengaged, whereby at least one of the multiple shift speeds is achieved. Therefore, when the shift speed is achieved, it is possible to de-energize the electromagnetic valves whose number is larger than the number of the energized electromagnetic valves. As a result, the electric power consumption can be reduced as compared to the case where the normal open type electromagnetic valve is used. Also, the first oil passage is connected to the electromagnetic valve, which is energized when a predetermined shift speed is achieved, from among the multiple electromagnetic valves. The oil pump is connected to the second oil passage which is different from the first oil passage. The switching device connects the first oil passage to the friction engaging element and disconnects the second oil passage from the friction engaging element when the electromagnetic valves can be energized. Also, the switching device disconnects the first oil passage from the friction engaging element and connects the second oil passage to the friction engaging element when the electromagnetic valves cannot be energized. Accordingly, when the electromagnetic valves can be energized, that is, at normal time, hydraulic pressure is supplied to the friction engaging elements through the electromagnetic valves, whereby engagement/disengagement of the friction engaging elements can be controlled. For example, when an electric failure has occurred and the electromagnetic valves cannot be energized, it is possible to achieve a predetermined shift speed by supplying hydraulic pressure from the oil pump, without using the electromagnetic valves, to the friction engaging elements and engaging the friction engaging elements. Accordingly, even when an electric failure has occurred, the shift speed can be achieved. It is therefore possible to provide the hydraulic control apparatus for an automatic transmission, which can reduce the electric power consumption at normal time, and which can achieve a shift speed even when an electric failure has occurred.

BRIEF DESCRIPTION OF THE DRAWINGS

The above-mentioned and other objects, features, advantages, technical and industrial significance of this invention will be better understood by reading the following detailed description of preferred embodiments of the invention, when considered in connection with the accompanying drawings, in which:

FIG. 3 is a table showing a relationship between shift speeds of the automatic transmission, and operational states of brakes and clutches;

FIG. 5 is a table showing a relationship between shift speeds of the automatic transmission, and operational states of linear solenoid, the brakes and the clutches.

DETAILED DESCRIPTION OF THE PREFERRED EMBODIMENTS

Figure 1:
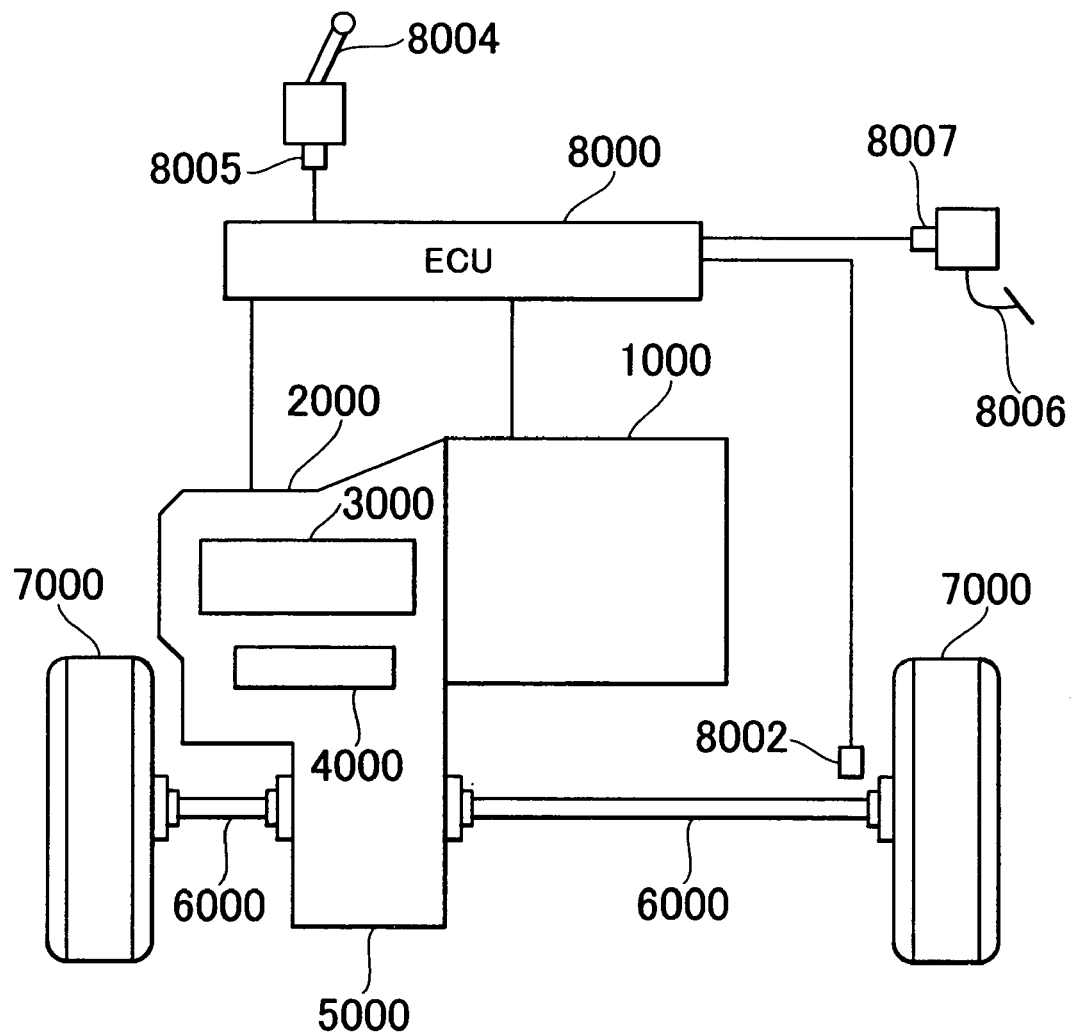
FIG. 1 is a control block diagram showing a vehicle including a hydraulic control apparatus for an automatic transmission according to an embodiment of the invention.

In the following description and the accompanying drawings, the present invention will be described in more detail with reference to exemplary embodiments. In the following description, the same reference numerals will be assigned to the same components. The names and the functions of the components having the same reference numerals are also the same. Therefore, the detailed description of the components having the same reference numerals will be made only once.

Hereafter, a description will be made concerning a vehicle including a control apparatus for an automatic transmission according to an embodiment of the invention, with reference to FIG. 1. The vehicle is a FF (front engine front drive) vehicle. Note that the vehicle including the control apparatus for an automatic transmission according to the embodiment may be a vehicle other than a FF vehicle.

The vehicle includes an engine 1000, a transmission 2000, a planetary gear unit 3000 which forms part of the transmission 2000, a hydraulic circuit 4000 which forms part of the transmission 2000, a differential gear 5000, a drive shaft 6000, front wheels 7000, and an ECU (electronic control unit) 8000.

The engine 1000 is an internal combustion engine which burns a mixture of fuel that is injected from an injector (not shown) and air in a combustion chamber of a cylinder. A piston in the cylinder is pushed downward due to combustion, and the crankshaft is rotated. Instead of the internal combustion engine, an external combustion engine may be used. Also, instead of the engine 1000, a rotary electric machine or the like may be used.

The transmission 2000 includes the planetary gear unit 3000 and the hydraulic circuit 4000. The transmission 2000 changes the rotational speed of the crankshaft to an intended rotational speed by achieving an intended shift speed. An output gear of the transmission 2000 is meshed with the differential gear 5000. The planetary gear unit 3000 and the hydraulic circuit 4000 will be described later in detail.

The drive shaft 6000 is coupled with the differential gear 5000 by spline coupling or the like. Power is transmitted to the front wheels 7000 via the drive shaft 6000.

A vehicle speed sensor 8002, a position switch 8065 of a shift lever 8004, and an accelerator pedal operation amount sensor 8007 of an accelerator pedal 8006 are connected to the ECU 8000 via a harness or the like.

The vehicle speed sensor 8002 detects a vehicle speed based on the rotational speed of the drive shaft 6000, and transmits a signal indicating the detection result to the ECU 8000. The position of the shift lever 8004 is detected by the position switch 8005, and a signal indicating the detection result is transmitted to the ECU 8000. A shift speed of the transmission 2000 is automatically achieved based on the position of the shift lever 8004. Also, a configuration may be such that a manual shift mode may be selected in which an intended shift speed can be selected based on an operation of the driver. The throttle valve opening amount sensor (not shown) detects an opening amount of a throttle valve (not shown) and transmits a signal indicating the detection result to the ECU 8000.

The ECU 8000 controls various devices so as to realize an intended running state of the vehicle based on the signals transmitted from the vehicle speed sensor 8002, the position switch 8005, the accelerator pedal operation amount sensor 8007, and maps and programs stored in ROM (read only memory).

Figure 2:
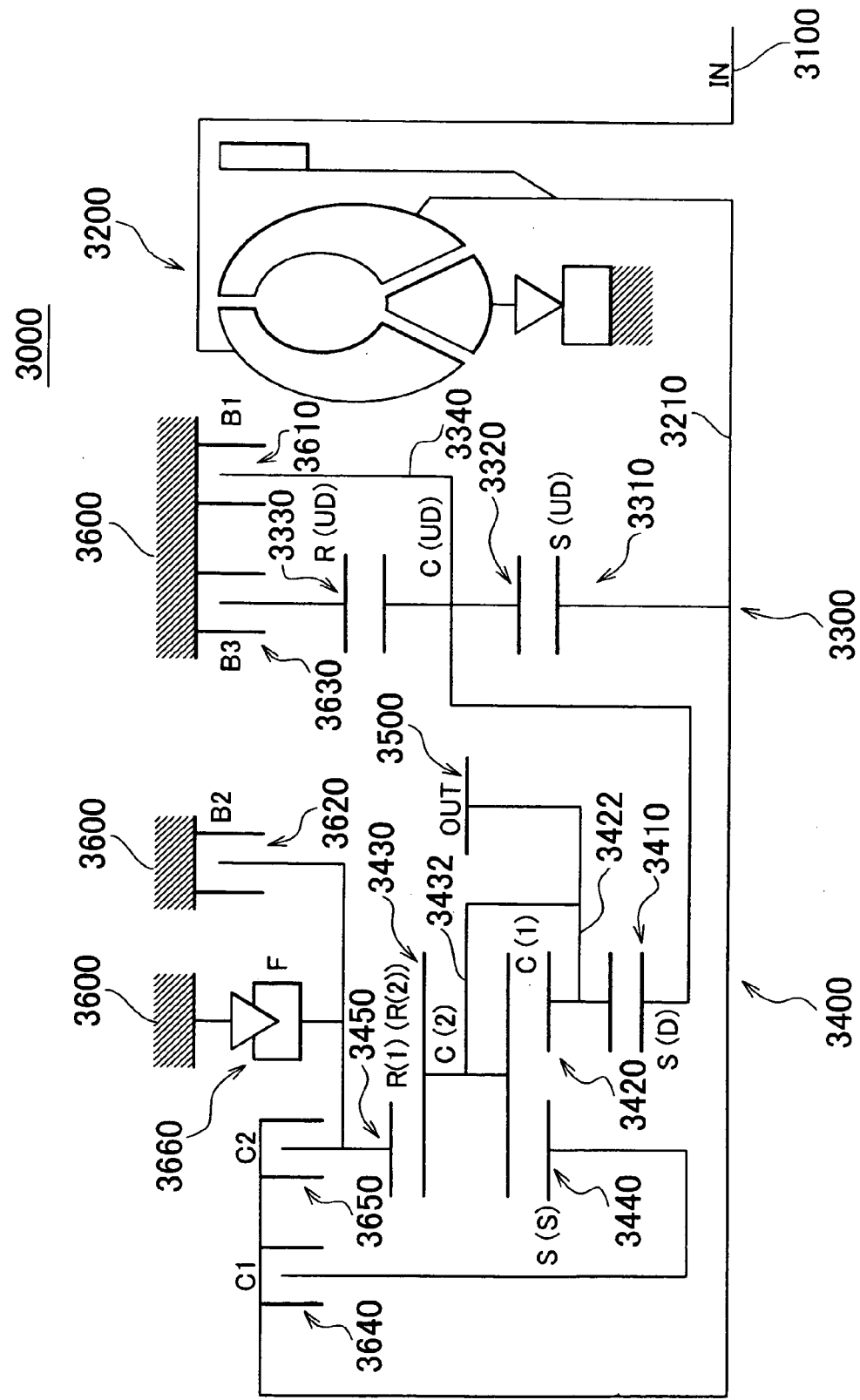
FIG. 2 is a skeleton diagram showing a planetary gear unit of the automatic transmission.

The planetary gear unit 3000 will be described with reference to FIG. 2. The planetary gear unit 3000 is connected to a torque converter 3200 including an input shaft 3100 coupled with the crankshaft. The planetary gear unit 3000 includes a first planetary gear set 3300; a second planetary gear set 3400; an output gear 3500; a B1 brake 3610, a B2 brake 3620 and a B3 brake 3630 which are fixed to a case 3600; a C1 clutch 3640; a C2 clutch 3650; and a one-way clutch F3660.

The first set 3300 is a single pinion type planetary gear set. The first set 3300 includes a sun gear S(UD) 3310; pinions 3320; a ring gear R(UD) 3330; and a carrier C(UD) 3340.

The sun gear S(UD) 3310 is fixed to an output shaft 3210 of the torque converter 3200. The pinions 3320 are rotatably supported by the carrier C(UD) 3340. The pinions 3320 are meshed with the sun gear S(UD) 3310 and the ring gear R(UD) 3330.

The ring gear R(UD) 3330 is fixed to the case 3600 by the B3 brake 3630. The carrier C(UD) 3340 is fixed to the case 3600 by the B1 brake 3610.

The second set 3400 is a Ravigneaux type planetary gear set. The second set 3400 includes a sun gear S(D) 3410; short pinions 3420; a carrier C(1) 3422; long pinions 3430; a carrier C(2) 3432; a sun gear S(S) 3440; and a ring gear R(1) (R(2)) 3450.

The sun gear S(D) 3410 is coupled with the carrier C(UD) 3340. The short pinions 3420 are rotatably supported by the carrier C(1) 3422. The short pinions 3420 are meshed with the sun gear S(D) 3410 and the long pinions 3430. The carrier C(1) 3422 is coupled with the output gear 3500.

The long pinions 3430 are rotatably supported by the carrier C(2) 3432. The long pinions 3430 are meshed with the short pinions 3420, the sun gear S(S) 3440 and the ring gear R(1) (R(2)) 3450. The carrier C(2) 3432 is coupled with the output gear 3500.

The sun gear S(S) 3440 is coupled with the output shaft 3210 of the torque converter 3200 by the C1 clutch 3640. The ring gear R(1) (R(2)) 3450 is fixed to the case 3600 by the B2 brake 3620, and coupled with the output shaft 3210 of the torque converter 3200 by the C2 clutch 3650. Also, the ring gear R(1) (R(2)) 3450 is coupled with the one-way clutch F3660, and cannot be rotated when the vehicle is driven at first speed.

FIG. 3 is a table showing a relationship between the shift speeds and the operational states of the clutches and the brakes. A circle signifies an engaged/applied state. An X signifies a disengaged/released state. A double circle signifies an engaged/applied state only when an engine brake is applied. A triangle signifies an engaged/applied state only when the engine drives the transmission. First to sixth forward speeds and a reverse speed are achieved by operating the brakes and the clutches according to the combinations shown in the table.

The one-way clutch F3660 is provided so as to be parallel to the B2 brake 3620. Accordingly, as shown by a double circle in the table, it is not necessary to apply the B2 brake 3620 when the engine drives the transmission (during acceleration) while first speed (1st) is achieved. In the embodiment, the one-way clutch F3660 prevents rotation of the ring gear R(1) (R(2)) when the vehicle is driven at first speed. When the engine brake is applied, the one-way clutch 3660 does not prevent rotation of the ring gear R(1) (R(2)).

Figure 4:
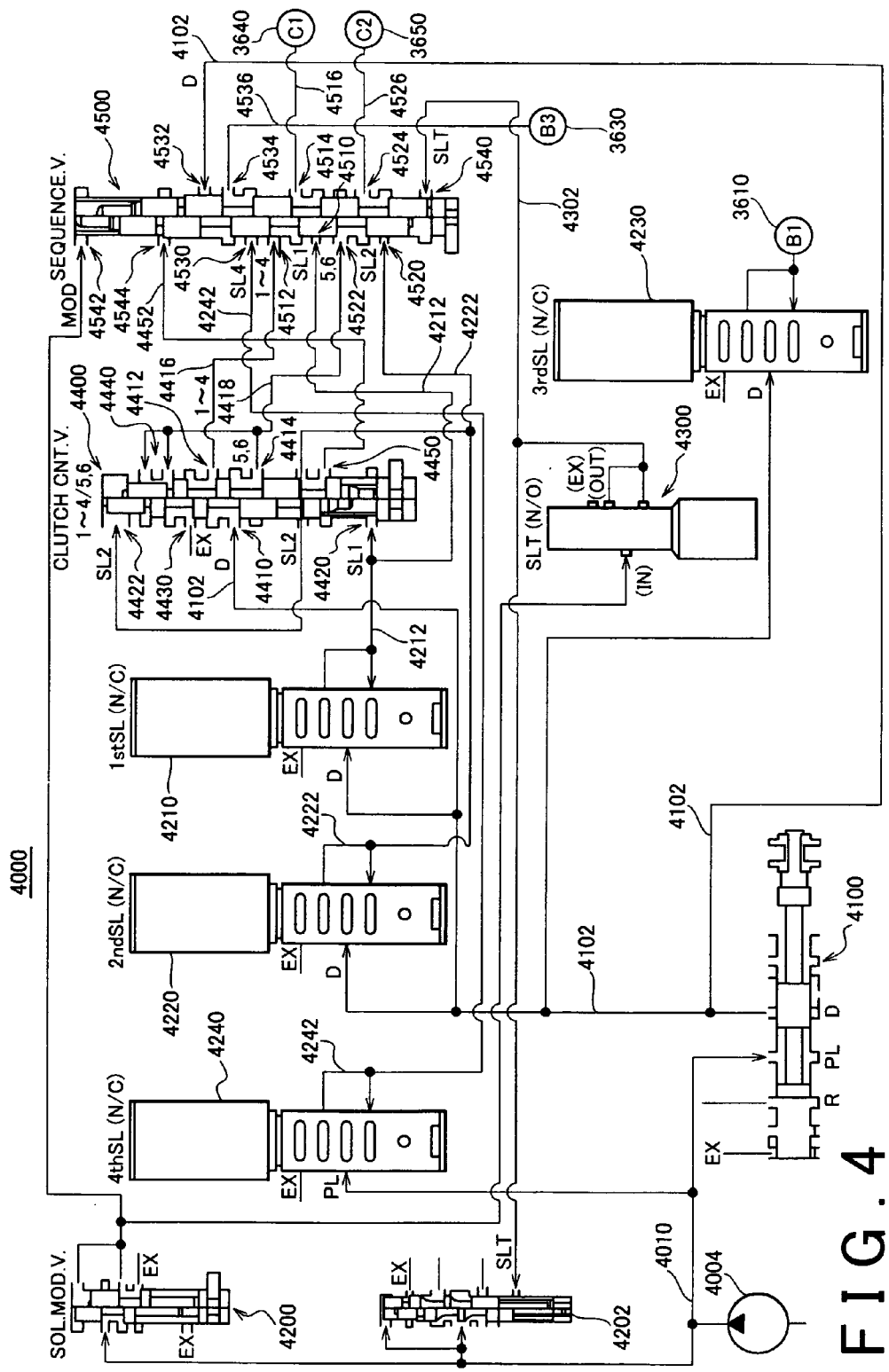
FIG. 4 is a diagram showing part of a hydraulic circuit of the hydraulic control apparatus.

The hydraulic circuit 4000 will be described with reference to FIG. 4. FIG. 4 shows only part of the hydraulic circuit 4000, which is related to the invention. The hydraulic circuit 4000 includes an oil pump 4004; a manual valve 4100; a solenoid modulator valve 4200; a primary regulator valve 4202; a first SL linear solenoid (hereinafter, referred to as a "first SL") 4210; a second SL linear solenoid (hereinafter, referred to as a "second SL") 4220; a third SL linear solenoid (hereinafter, referred to as a "third SL") 4230; a fourth SL linear solenoid (hereinafter, referred to as a "fourth SL") 4240; a SLT linear solenoid (hereinafter, referred to as a "SLT") 4300; a clutch control valve 4400; a sequence valve 4500; and a B2 control valve.

The oil pump 4004 is coupled with the crankshaft of the engine 1000. The oil pump 4004 is driven due to rotation of the crankshaft, and generates hydraulic pressure. The hydraulic pressure generated by the oil pump 4004 is adjusted by the primary regulator valve 4202 that operates using the throttle pressure, which is controlled by the SLT 4300, as pilot pressure. The line pressure is thus generated. As the throttle pressure increases, the line pressure increases. The line pressure is supplied to the manual valve 4100, the solenoid modulator valve 4200, and the fourth SL 4240 through a PL oil passage 4010.

The manual valve 4100 is coupled with the shift lever 8004. The position of a spool of the manual valve 4100 is changed based on the position of the shift lever 8004. When the spool is at the drive position (D), the line pressure is supplied to a D range oil passage 4102. When the spool is at the reverse position (R), the hydraulic pressure generated by the oil pump 4004 is supplied to a R range oil passage 4104.

The solenoid modulator valve 4200 adjusts the line pressure to a constant pressure. The solenoid modulator valve 4200 is connected to the SLT 4300 and the sequence valve 4500. The hydraulic pressure which is adjusted to a constant pressure by the solenoid modulator valve 4200 (solenoid modulator pressure) is supplied to the SLT 4300 and the sequence valve 4500.

The first SL 4210 is a normal closed type linear solenoid valve which interrupts hydraulic pressure in the non-energized state. The first SL 4210 is connected to the D range passage 4102, and connected to the clutch control valve 4400 and the sequence valve 4500 through a SL1 oil passage 4212. The first SL 4210 controls the hydraulic pressure to be supplied to a servo of the C1 clutch 3640.

The second SL 4220 is a normal closed type linear solenoid valve which interrupts hydraulic pressure in the non-energized state. The second SL 4220 is connected to the D range oil passage 4102, and connected to the clutch control valve 4400 and the sequence valve 4500 through a SL2 oil passage 4222. The second SL 4220 controls the hydraulic pressure to be supplied to a servo of the C2 clutch 3650.

The third SL 4230 is a normal closed type linear solenoid valve which interrupts hydraulic pressure in the non-energized state. The third SL 4230 is connected to the D range oil passage 4102. The third SL 4230 controls the hydraulic pressure to be supplied to a servo of the B1 brake 3610.

The fourth SL 4240 is a normal closed type linear solenoid valve which interrupts hydraulic pressure in the non-energized state. The fourth SL 4240 is connected to the SL oil passage 4010, and connected to the sequence valve 4500 through a SL4 oil passage 4242. The fourth SL 4240 controls the hydraulic pressure to be supplied to a servo of the B3 brake 3630.

The SLT 4300 is a normal open type linear solenoid valve which can supply hydraulic pressure in the non-energized state. The SLT 4300 adjusts the solenoid modulator pressure based on torque information prepared according to an accelerator pedal operation amount of the accelerator pedal 8006, an intake air amount of the engine 1000, a coolant temperature of the engine 1000, a rotational speed of the engine 1000, and the like, and generates the throttle pressure. The throttle pressure generated by the SLT 4300 is supplied to the sequence valve 4500 and the primary regulator valve 4202 through a SLT oil passage 4302.

Instead of the first SL 4210, the second SL 4220, the third SL 4230, the fourth SL 4240 and the SLT 4300, an ON/OFF solenoid may be used such that the hydraulic pressure is controlled by duty control, or a solenoid valve and a control valve may be used in combination so as to control the hydraulic pressure.

The clutch control valve 4400 includes a D port (C) 4410; a low speed port (C) 4412; a high speed port (C) 4414; a SL1 port (C) 4420; a SL2 port (C) 4422; a drain port 4430; ports 4440, and a SL port (C) 4450.

The D port (C) 4410 is connected to the D range oil passage 4102. The D port (C) 4410 is communicated with one of the low speed port (C) 4412 and the high speed port (C) 4414 by the spool of the clutch control valve 4400.

The low speed port (C) 4412 is communicated with the D port (C) 4410 when one of first to fourth speeds is achieved. The low speed port (C) 4412 is communicated with the drain port 4430 when the high speed port (C) 4414 is communicated with the D port (C) 4410. The low speed port (C) 4412 is connected to the sequence valve 4500 through a low speed oil passage 4416.

The high speed port (C) 4414 is communicated with the D port (C) 4410 when fifth or sixth speed is achieved. The high speed port (C) 4414 is connected to the sequence valve 4500 through a high speed oil passage 4418.

The SL1 port (C) 4420 is connected to the SL1 oil passage 4212. The SL2 port (C) 4422 is connected to the SL2 oil passage 4222. The ports 4440 are connected to the high speed oil passage 4418. The ports 4440 are communicated with the drain port 4430 when the low speed port (C) 4412 is communicated with the D port (C) 4410.

The clutch control valve 4400 is controlled by the hydraulic pressure supplied to the SL1 port (C) 4420, the hydraulic pressure supplied to the SL2 port (C) 4422, the hydraulic pressure supplied to the ports 4440, and a spring.

The SL port (C) 4450 is connected to the sequence valve 4500 through a SL oil passage 4452. When one of first to fourth speeds is achieved, the hydraulic pressure adjusted by the first SL 4210 is supplied to the SL oil passage 4452 through the SL port (C) 4450. When fifth speed or six speed is achieved, the hydraulic pressure adjusted by the second SL 4220 is supplied to the SL oil passage 4452 through the SL port (C) 4450.

The sequence valve 4500 includes a SL1 port (S) 4510; a low speed port (S) 4512; a C1 port 4514; a SL2 (S) port 4520; a high speed port (S) 4522; a C2 port 4524; a SL4 port 4530; a D port (S) 4532; a B3 port 4534; a SLT port 4540; a modulator port 4542; and a SL port (S) 4544.

The SL1 port (S) 4510 is connected to the SL1 oil passage 4212. The low speed port (S) 4512 is connected to the low speed oil passage 4416. The C1 port 4514 is connected to the servo of the C1 clutch 3640 through a C1 oil passage 4516. The C1 port 4514 is communicated with one of the SL1 port (S) 4510 and the low speed port (S) 4512 by the spool of the sequence valve 4500.

The SL2 port (S) 4520 is connected to the SL2 oil passage 4222. The high speed port (S) 4522 is connected to the high speed oil passage 4418. The C2 port 4524 is connected to the servo of the C2 clutch 3650 through a C2 oil passage 4526. The C2 port 4524 is communicated with one of the SL2 port (S) 4520 and the high speed port (S) 4522 by the spool of the sequence valve 4500.

The SL4 port 4530 is connected to the SL4 oil passage 4242. The D port (S) 4532 is connected to the D range oil passage 4102. The B3 port 4534 is connected to the servo of the B3 brake 3630 through a B3 oil passage 4536. The B3 port 4534 is communicated with one of the SL4 port 4530 and the D port (S) 4532 by the spool of the sequence valve 4500.

The SLT port 4540 is connected to the SLT oil passage 4302. The modulator port 4542 is connected to the solenoid modulator valve 4200. The SL port (S) 4544 is connected to the SL oil passage 4452.

The sequence valve 4500 is controlled by the hydraulic pressure supplied to the SLT port 4540 (throttle pressure), the hydraulic pressure supplied to the modulator port 4542 (solenoid modulator pressure), the hydraulic pressure supplied to the SL port (S) 4544 (the hydraulic pressure adjusted by the first SL 4210 or the second SL 4220), and the spring. Thus, the hydraulic pressure adjusted by the first SL 4210 or the second SL 4220 is used for the sequence valve 4500 as the counterforce for the throttle pressure. Therefore, the sensitivity of the sequence valve 4500 for the throttle pressure is reduced, and the state of sequence valve 4500 is prevented from being switched unnecessarily during the control of the throttle pressure.

Also, supplying hydraulic pressure from the solenoid modulator valve 4200 to the modulator port 4542 makes it possible to reduce the load placed on the spring, the size of the spring, and the size of the sequence valve 4500. Instead of the modulator port 4542, a drain port may be provided, and hydraulic pressure may be drained from the drain port.

FIG. 5 is a table showing a relationship between the shift speeds and operational states of the linear solenoids, the clutches and the brakes. The table concerning the operational states of the clutches and the brakes (the table on the right side in FIG. 5) is the same as the table shown in FIG. 3.

In the table showing the operational states of the linear solenoids, a circle signifies an energized state, an X signifies a non-energized state. By operating the linear solenoids according to the combinations shown in the table, the clutches are engaged and the brakes are applied, and first to six forward speeds and a reverse speed are achieved.

When the system is activated, the SLT 4300 is energized in order to control the throttle pressure. Since the SLT 4300 is a normal open type solenoid valve, the throttle pressure becomes the maximum value in the non-energized state. The throttle pressure in the energized state is reduced as compared to the non-energized state.

In the hydraulic control apparatus for an automatic transmission according to the embodiment, when only the first SL 4210 is energized and the other linear solenoids are de-energized, first speed is achieved. When the first SL 4210 and the third 4230 are energized and the other linear solenoids are de-energized, second speed is achieved. When the first SL 4210 and the fourth SL 4240 are energized and the other linear solenoids are de-energized, third speed is achieved. When the first SL 4210 and the second SL 4220 are energized and the other linear solenoids are de-energized, fourth speed is achieved. When the second SL 4220 and the fourth SL 4240 are energized and the other linear solenoids are de-energized, fifth speed is achieved. When the second SL 4220 and the third SL 4230 are energized and the other linear solenoids are de-energized, sixth speed is achieved.

Hereafter, effects of the hydraulic control apparatus for an automatic transmission according to the embodiment, which can be obtained due to the above-mentioned structure, will be described. The description for each shift speed will be made.

A description concerning first speed will be made. When first speed is achieved at normal time, only the first SL 4210 is energized and the other three linear solenoids are de-energized. When the first SL 4210 is energized, hydraulic pressure is supplied from the SL (1) 4210 to the SL1 port (C)4420 of the clutch control valve 4400 and the SL1 port (S) 4510 of the sequence valve 4500 through the oil pump 4004, the manual valve 4100, and the D range oil passage 4102. Since being normal closed type, the other linear solenoids do not supply hydraulic pressure in the non-energized state.

Although hydraulic pressure is supplied to the SL1 port (C) 4420 of the clutch control valve 4400, hydraulic pressure is not supplied to the SL2 port (C) 4422. Accordingly, the clutch control valve 4400 is brought to the state on the left side in FIG. 4. In this state, communication between the D port (C) 4410 and the low speed port (C) 4412 is permitted, and communication between the D port (C) 4410 and the high speed port (C) 4414 is interrupted. Accordingly, hydraulic pressure is supplied to the low speed port (S) 4512 of the sequence valve 4500.

Also, hydraulic pressure is supplied from the first SL 4210 to the SL port (S) 4544 of the sequence valve 4500 through the SL oil passage 4452, the SL port (C) 4450, and the SL1 port (C) 4420.

Meanwhile, since the hydraulic pressure supplied from the SLT 4300 to the SLT port 4540 of the sequence valve 4500 has been decreased due to energization of the SLT 4300, the sequence valve 4500 is brought to the state on the right side in FIG. 4. Accordingly, communication between the SL1 port (S) 4510 and the C1 port 4514 is permitted, and communication between the low speed port (S) 4512 and the C1 port 4514 is interrupted.

Thus, the hydraulic pressure controlled by the first SL 4210 is supplied to the servo of the C1 clutch 3640, and the C1 clutch 3640 is engaged, whereby first speed is achieved. When first speed is achieved, only the first SL 4210 is energized from among the four linear solenoids. It is therefore possible to reduce electric power consumption.

If an electric failure occurs when first speed is achieved, all the linear solenoids are de-energized. Accordingly, the hydraulic pressure supplied from the first SL 4210 to the SL1 port (C) 4420 of the clutch control valve 4400 is eventually drained from the drain port of the first SL 4210. In this case, the clutch control valve 4400 is maintained in the state on the left side in FIG. 4 due to an urging force of the spring. Accordingly, when the engine 1000 is driven and the manual valve 4100 is at the drive position, as in the case in which first speed is achieved at normal time, hydraulic pressure is supplied to the low speed port (S) 4512 of the sequence valve 4500 through the D range oil passage 4102.

When the SLT 4300 is de-energized, hydraulic pressure is supplied, without being controlled (without being decreased), to the SLT port 4540 of the sequence valve 4500. Also, when the first SL 4210is de-energized, the hydraulic pressure supplied to the SL port 4544 is eventually drained from the drain port of the first SL 4210. Thus, the sequence valve 4500 is switched to the state on the left side in FIG. 4. Accordingly, communication between the low speed port (S) 4512 and the C1 port 4514 is permitted, and hydraulic pressure is supplied to the servo of the C1 clutch 3640, whereby the C1 clutch 3640 is engaged.

Also, when the sequence valve 4500 is switched to the state on the left side in FIG. 4, communication between the D port (S) 4532 and the B3 port 4534 is permitted. Thus, hydraulic pressure is provided from the D range oil passage 4102 to the servo of the B3 brake 3630, and the B3 brake 3630 is applied.

When the C1 clutch 3640 is engaged and the B3 brake 3630 is applied, third speed is achieved. Thus, the shift speed is increased from first speed to third speed, and the vehicle can continue running even when an electric failure has occurred.

In the embodiment, a normal open type solenoid valve is used as the SLT 4300. However, a normal closed type solenoid valve may be used as the SLT 4300, and the configuration may be such that the sequence valve 4500 is switched to the state on the left side in FIG. 4 when an electric failure has occurred.

A description concerning second speed will be made. In the case where second speed is achieved at normal time, the operational states of all the elements are the same as those in the case where first speed is achieved, except that the third SL 4230 is energized. When the third SL 4230 is energized, hydraulic pressure is supplied from the third SL 4230 to the servo of the B1 brake 3610, and the B1 brake 3610 is applied. The other operations are the same as those when first speed is achieved. Accordingly, the detailed description will not be made here.

Concerning the operation when an electric failure has occurred, in the case where second speed is achieved, the operational states of all the elements are the same as those in the case where first speed is achieved, except that the B1 brake 3610 is released and the B3 brake 3630 is applied. When an electric failure has occurred, all the linear solenoids are de-energized. Accordingly, the hydraulic pressure supplied from the third SL 4230 to the B1 brake 3610 is eventually drained from the drain port of the third SL 4230.

Also, as in the case where an electric failure occurs when first speed is achieved, the C1 clutch 3640 is kept engaged, and the B3 brake 3630 is applied. Thus, the shift speed is increased from second speed to third speed, and the vehicle can continue running.

A description concerning third speed will be made. In the case where third speed is achieved at normal time, the operational states of all the elements are the same as those in the case where first speed is achieved, except that the fourth SL 4240 is energized. As in the case where first speed is achieved, the sequence valve 4500 is switched to the state on the right side in FIG. 4. Therefore, communication between the SL4 port 4530 and the B3 port 4534 is permitted, and hydraulic pressure is supplied from the fourth SL 4240 to the servo of the B3 brake 3630, whereby the B3 brake 3630 is applied. The other operations are the same as those when first speed is achieved. Accordingly, the detailed description will not be made here.

Concerning the operation when an electric failure has occurred, in the case where third speed is achieved, the operational states of all the elements are the same as those in the case where first speed is achieved, except that the B3 brake 3630 is kept engaged. If an electric failure occurs when third speed is achieved, all the linear solenoids are de-engaged. Therefore, the hydraulic pressure supplied from the first SL 4210 and the hydraulic pressure supplied from the fourth SL 4240 are eventually drained from the drain ports of the first SL 4210 and the fourth SL 4240, respectively.

Also, as in the case where an electric failure occurs when first speed is achieved, eventually the C1 clutch 3640 is engaged and the Brake 3630 is applied. Although the hydraulic pressure supply route is changed, the C1 clutch 3640 is kept engaged and the B3 brake 3630 is kept applied. Thus, third speed is maintained, and the vehicle can continue running even when an electric failure has occurred.

A description concerning fourth speed will be made. The case where fourth speed is achieved at normal time, the operational states of all the elements are the same as those in the case where first speed is achieved, except that the second SL 4220 is energized. When the second SL 4220 is energized, hydraulic pressure is supplied from the second SL 4220 to the SL2(C) port 4422 of the clutch control valve 4400 and the SL2(S) port 4520 of the sequence valve 4500.

Even when hydraulic pressure is supplied to the SL2(C) port 4422 of the clutch control valve 4400, as in the case where first speed is achieved, hydraulic pressure is supplied to the SL1(C) port 4420. Accordingly, the sum of the hydraulic pressure from the first SL 4210, the hydraulic pressure supplied to the ports 4440 and the urging force of the spring is larger than the hydraulic pressure from the second SL 4220. Therefore, the clutch control valve 4400 is brought to the state on the left side in FIG. 4, as in the case where first speed is achieved.

Meanwhile, the sequence valve 4500 is brought to the state on the right side in FIG. 4, as in the case where first speed is achieved. Therefore, communication between the SL2 port (S) 4520 and the C2 port 4524 of the sequence valve 4500 is permitted, hydraulic pressure is supplied from the second SL 4220 to the servo of the C2 clutch 3650, whereby the C2 clutch 3650 is engaged. The other operations are the same as those when first speed is achieved. Accordingly, the detailed description will not be made here.

Concerning the operation when an electric failure has occurred, in the case where fourth speed is achieved, the operational states of all the elements are the same as those in the case where first speed is achieved, except that the C2 clutch 3650 is disengaged, and the released B3 brake 3630 is applied. If an electric failure occurs when fourth speed is achieved, the second SL 4220 is de-energized. Accordingly, the hydraulic pressure supplied to the SL2 port (S) 4520 is drained from the drain port of the second SL 4220. Therefore, the hydraulic pressure supplied to the servo of the C2 clutch 3650 is eventually drained from the drain port of the second SL 4220, and the C2 clutch 3650 is disengaged.

As in the case where first speed is achieved, the sequence valve 4500 is brought to the state on the left side in FIG. 4, and communication between the high speed port (S) 4522 and the C2 port 4524 is permitted. Since the clutch control valve 4400 is maintained in the state on the left side in FIG. 4, as in the case where first speed is achieved, the high speed port (C) 4414 is connected to the drain port 4430 through the ports 4440. Therefore, the servo of the C2 clutch 3650 is eventually communicated with the drain port 4430 of the clutch control valve 4400.

Between the servo of the C2 clutch 3650 and the second SL 4220, the C2 clutch 3650 is communicated with the drain port 4430. Accordingly, the relative distance between the servo of the C2 clutch 3650 and the drain port 4430 is reduced. As a result, hydraulic pressure is easily drained from the servo of the C2 clutch 3650, and hydraulic pressure from the other oil passages is prevented from leaking into this passage, whereby generation of residual pressure can be suppressed. The other operations are the same as those when first speed is achieved. Accordingly, the detailed description will not be made here.

A description concerning fifth speed will be made. When fifth speed is achieved at normal time, the second SL 4220 and the fourth SL 4240 are energized, and the other two linear solenoids are de-energized. When the second SL 4220 is energized, hydraulic pressure is supplied from the second SL 4220 to the SL2 port (C) 4422 of the clutch control valve 4400 and the SL2 port (S) 4520 of the sequence valve 4500 through the oil pump 4004, the manual valve 4100, and the D range oil passage 4102.

When the fourth SL 4240 is energized, hydraulic pressure is supplied from the fourth SL 4240 to the SL4 port 4530 of the sequence valve 4500 through the oil pump 4004. Since being normal closed type, the other two linear solenoids do not supply hydraulic pressure in the non-energized state.

Accordingly, although hydraulic pressure is supplied to the SL2 port (C) 4422 of the clutch control valve 4400, hydraulic pressure is not supplied to the SL1 port (C) 4420. Therefore, the clutch control valve 4400 is brought to the state on the right side in FIG. 4. In this state, communication between the D port (C) 4410 and the high speed port (C) 4414 is permitted, and communication between the D port (C) 4410 and the low speed port (C) 4412 is interrupted. Accordingly, hydraulic pressure is supplied to the high speed port (S) 4522 of the sequence valve 4500.

Part of the hydraulic pressure flowing through the high speed oil passage 4418 is returned to the ports 4440 of the clutch control valve 4400. Thus, a force to maintain the clutch control valve 4400 in the state on the right side in FIG. 4 is applied.

Also, hydraulic pressure is supplied from the second SL 4220 to the SL port (S) 4544 of the sequence valve 4500 through the SL oil passage 4452 and the SL port (C) 4450.

Meanwhile, the hydraulic pressure supplied from the SLT 4300 to the SLT port 4540 of the sequence valve 4500 is suppressed by energization of the SLT 4300. Accordingly, the sequence valve 4500 is brought to the state on the right side in FIG. 4. Therefore, communication between the SL2 port (S) 4520 and the C2 port 4524 is permitted, and communication between the high speed port (S) 4522 and the C2 port 4524 is interrupted. Thus, the hydraulic pressure controlled by the second SL 4220 is supplied to the servo of the C2 clutch 3650, and the C2 clutch 3650 is engaged.

Also, since the sequence valve 4500 is in the state on the right side in FIG. 4, communication between the SL4 port 4530 and the B3 port 4534 is permitted, and hydraulic pressure is supplied from the fourth SL 4240 to the servo of the B3 brake 3630, whereby the B3 brake 3630 is applied. When the C2 clutch 3650 is engaged and the B3 brake 3630 is applied, fifth speed is achieved.

If an electric failure occurs when fifth speed is achieved, all the linear solenoids are de-energized. Accordingly, hydraulic pressure is drained from the second SL 4220. Therefore, the hydraulic pressure supplied to the SL2 port (C) 4422 of the clutch control valve 4400 is drained.

At this time, a force for maintaining the clutch control valve 4400 in the state on the right side in FIG. 4 is applied due to the hydraulic pressure supplied to the ports 4440 of the clutch control valve 4400. Accordingly, the clutch control valve 4400 is maintained in the state on the right side in FIG. 4. Therefore, when the engine 1000 operates and the manual valve 4100 is at the drive position, as in the case where fifth speed is achieved at normal time, hydraulic pressure is supplied to the high speed port (S) 4522 of the sequence valve 4500 through the D range oil passage 4102.

When the SLT 4300 is de-energized, the hydraulic pressure is supplied to the SLT 4540 of the sequence valve 4500 without being controlled (without being decreased). Accordingly, the sequence valve 4500 is switched to the state on the left side in FIG. 4. Therefore, communication between the high speed port (S) 4522 and the C2 port 4524 is permitted, and hydraulic pressure is supplied to the servo of the C2 clutch 3650, whereby the C2 clutch 3650 is engaged.

Also, when the sequence valve 4500 is switched to the state on the left side in FIG. 4, communication between the D port (S) 4532 and the B3 port 4534 is permitted. Thus, hydraulic pressure is supplied from the D range oil passage 4102 to the servo of the B3 brake 3630, whereby the B3 brake 3630 is applied.

When the C2 clutch 3650 is engaged and the B3 brake 3630 is applied, fifth speed is achieved. Namely, if an electric failure occurs when fifth speed is achieved, fifth speed is maintained, and the vehicle can continue running even when an electric failure has occurred.

In the case where an electric failure occurs when fifth speed is achieved, if hydraulic pressure is drained from the D range oil passage 4102, for example, by operating the manual valve 4100 to the neutral position, hydraulic pressure is drained from the ports 4440 of the clutch control valve 4400, and the clutch control valve 4400 is brought to the state on the left side in FIG. 4 due to the urging force of the spring. Accordingly, when hydraulic pressure is re-supplied to the D range oil passage 4102, hydraulic pressure is supplied from the D range oil passage 4102 to the servo of the C1 clutch 3640, whereby third speed is achieved.

A description concerning sixth speed will be made. In the case where sixth speed is achieved at normal time, the operational states of all the elements are the same as those in the case where fifth speed is achieved, except that the third SL 4230 is energized instead of the fourth SL 4240. When the third SL 4230 is energized, hydraulic pressure is supplied from the third SL 4230 to the servo of the B1 brake 3610, whereby the B1 brake 3610 is applied. The other operations are the same as those when fifth speed is achieved. Accordingly, the detailed description will not be made here.

Concerning the operation when an electric failure has occurred, the operational state in the case where sixth speed is achieved differs from the operational state in the case fifth speed is achieved in that the B1 brake 3610 is released, and the released B3 brake 3630 is applied.

When an electric failure has occurred, all the linear solenoids are de-energized. Accordingly, the hydraulic pressure supplied from the third SL 4230 to the B1 brake 3610 is eventually drained from the drain port of the third SL 4230.

Also, as in the case where an electric failure occurs when fifth speed is achieved, hydraulic pressure is supplied to the servo of the C2 clutch 3650 and the servo of the B3 brake 3630. Thus, the C2 clutch 3650 is kept engaged, and the B3 brake 3630 is applied. Accordingly, the shift speed is decreased from sixth speed to fifth speed, and the vehicle can continue running.

As described so far, the hydraulic control apparatus for an automatic transmission according to the embodiment includes the normal closed type first SL; the normal closed type second SL; the normal closed type third SL; the normal closed type fourth SL; and the sequence valve which connects the first SL to the servo of the C1 clutch, the second SL to the servo of the C2 clutch, and the fourth SL to the servo of the B3 brake at normal time and which connects the D range oil passage to the servo of the C1 clutch, the servo of the C2 clutch and the servo of the B3 brake when an electric failure has occurred. When only the first SL is energized and the other three linear solenoids are de-energized, first speed is achieved. Thus, when first speed, at which the gear ratio is great and a larger amount of fuel is likely to be consumed, is achieved, the electric power consumption can be reduced. The electric power to be supplied to the solenoid valves is usually generated by an alternator which is connected to the crankshaft of the engine. Accordingly, when electric power consumption can be reduced, the load placed on the engine is reduced and reduction in fuel efficiency can be suppressed.

When an electric failure has occurred, hydraulic pressure is supplied from the oil pump to the D range oil passage. Accordingly, one of the C1 clutch and the C2 clutch is engaged and the B3 brake is applied. Thus, when an electric failure has occurred, third speed or fifth speed can be achieved, and the vehicle can continue running.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A hydraulic control apparatus for an automatic transmission, which is mounted in a vehicle, which includes multiple friction engaging elements each of which is engaged by being supplied with hydraulic pressure, and in which less than a half of the multiple friction engaging elements are engaged by being supplied with hydraulic pressure and the friction engaging elements other than the friction engaging elements that are supplied with the hydraulic pressure are disengaged, whereby at least one of multiple shift speeds is achieved, comprising:

normal closed type electromagnetic valves which are provided so as to correspond to the friction engaging elements such that hydraulic pressure is supplied to the friction engaging elements;

an oil pump which generates hydraulic pressure to be supplied to the electromagnetic valves and the friction engaging elements;

a first oil passage which is connected to the electromagnetic valve that is energized when a predetermined shift speed is achieved from among the multiple electromagnetic valves;

a second oil passage which is connected to the oil pump and which is different from the first oil passage; and a switching device which connects the first oil passage to the friction engaging element and disconnects the second oil passage from the friction engaging element when the electromagnetic valves can be energized, and which disconnects the first oil passage from the friction engaging element and connects the second oil passage to the friction engaging element when the electromagnetic valves cannot be energized.

2. The hydraulic control apparatus for an automatic transmission according to claim 1, further comprising:

a draining device that drains hydraulic pressure from the friction engaging elements other than the friction engaging element, which is engaged when a predetermined shift speed is achieved, from among the multiple friction engaging elements when the predetermined shift speed is achieved.

3. The hydraulic control apparatus for an automatic transmission according to claim 1, wherein the predetermined shift speed includes two shift speeds whose gear ratios are different from each other.

4. The hydraulic control apparatus for an automatic transmission according to claim 1, further comprising:
a normal open type electromagnetic valve to which hydraulic pressure is supplied from the oil pump, wherein
the switching device is a valve which is operated by being supplied with hydraulic pressure from the normal open type electromagnetic valve.

5. The hydraulic control apparatus for an automatic transmission according to claim 4, wherein an accelerator pedal operation amount sensor which detects an operation amount of an accelerator pedal is provided in the vehicle, and the normal open type electromagnetic valve is an electromagnetic valve which adjusts the hydraulic pressure supplied from the oil pump based on the accelerator pedal operation amount.

* * * * *

UNITED STATES PATENT AND TRADEMARK OFFICE
CERTIFICATE OF CORRECTION

PATENT NO. : 7,175,556 B2  
APPLICATION NO. : 11/075876  
DATED : February 13, 2007  
INVENTOR(S) : Masaru Morise et al.

It is certified that error appears in the above-identified patent and that said Letters Patent is hereby corrected as shown below:

In the Title page on the last line of the ABSTRACT: After "brake" delete ",";

change "gas occurred" to --has occurred--.

| Column | Line | |
|---|---|---|
| 4 | 45 | Change "spline" to --splined--. |
| 4 | 47 | Change "8065" to --8005--. |
| 7 | 48 | Change "six" to --sixth--. |
| 8 | 45 | Change "six" to --sixth--. |
| 8 | 56 | Change "third 4230" to --third SL 4230--. |
| 9 | 11 | Change "(C)4420" to --(C) 4420--. |
| 9 | 14 | Change "being" to --they are the--. |
| 9 | 60 | Change "4210is" to --4210 is--. |
| 11 | 1 | Change "Brake" to --B3 brake--. |
| 11 | 6 | Change "The" to --In the--. |
| 12 | 11 | Change "being" to --they are the--. |

UNITED STATES PATENT AND TRADEMARK OFFICE
CERTIFICATE OF CORRECTION

PATENT NO. : 7,175,556 B2
APPLICATION NO. : 11/075876
DATED : February 13, 2007
INVENTOR(S) : Masaru Morise et al.

It is certified that error appears in the above-identified patent and that said Letters Patent is hereby corrected as shown below:

| Column | Line | |
|---|---|---|
| 13 | 38 | Change "case fifth" to --case where the fifth--. |

Signed and Sealed this

Tenth Day of July, 2007

JON W. DUDAS
*Director of the United States Patent and Trademark Office*